(12) United States Patent
Cho et al.

(10) Patent No.: US 7,059,464 B2
(45) Date of Patent: Jun. 13, 2006

(54) MANUFACTURING SYSTEM

(75) Inventors: Ku-nam Cho, Suwon (KR); Hyoung-sik Shin, Yongin (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/874,812

(22) Filed: Jun. 24, 2004

(65) Prior Publication Data

US 2005/0034959 A1   Feb. 17, 2005

(30) Foreign Application Priority Data

Jun. 24, 2003   (KR)   ...................... 10-2003-0041248

(51) Int. Cl.
*B65G 15/64*   (2006.01)

(52) U.S. Cl. ................... 198/346; 198/345.3; 198/577; 29/33 P

(58) Field of Classification Search ................ 198/346, 198/465.1, 577, 583, 345.3; 29/593, 831, 29/564.1, 33 P, 739–742
See application file for complete search history.

(56) References Cited

U.S. PATENT DOCUMENTS

| | | | | |
|---|---|---|---|---|
| 2,523,829 A | * | 9/1950 | Hubbell | ...................... 198/346 |
| 2,860,404 A | * | 11/1958 | Alden | ........................ 198/346 |
| 4,762,218 A | * | 8/1988 | Sticht | ........................ 198/583 |
| 4,772,176 A | * | 9/1988 | Montgomery | ............ 198/465.2 |
| 4,787,496 A | * | 11/1988 | Prodel et al. | ................ 198/583 |
| 5,316,125 A | * | 5/1994 | Matsushima et al. | ....... 198/583 |
| 5,358,464 A | * | 10/1994 | Funk et al. | ................. 198/577 |
| 6,308,496 B1 | * | 10/2001 | Lee et al. | ................. 198/345.3 |
| 6,339,764 B1 | | 1/2002 | Livesay et al. | |
| 6,467,605 B1 | * | 10/2002 | Head, III | ............... 198/341.07 |

OTHER PUBLICATIONS

English Abstract of Korean Document No. 1999-81553, Published Nov. 15, 1999 in Korea (Korean Document No. 1999-81553 was previously submitted in an Information Disclosure Statement filed Sep. 8, 2004).
English Abstract of Korean Document No. 2001-56407, Published Jul. 4, 2001 in Korea (Korean Document No. 2001-56407 was previously submitted in an Information Disclosure Statement filed Sep. 8, 2004).
English Abstract of Korean Document No. 1998-41642, Published Aug. 17, 1998 in Korea (Korean Document No. 1998-41642 was previously submitted in an Information Disclosure Statement filed Sep. 8, 2004).

(Continued)

*Primary Examiner*—James R. Bidwell
(74) *Attorney, Agent, or Firm*—Staas & Halsey LLP

(57) ABSTRACT

A manufacturing system that includes a plurality of worktables detachably combined with each other, each of the worktables further includes a mainframe, a transport part provided in an upper part of the mainframe and transporting a product, and a control part provided in the mainframe and controlling the transporting speed of the transport part. The manufacturing system is readily changeable in its arrangement responding to changes in the amount of production.

19 Claims, 5 Drawing Sheets

OTHER PUBLICATIONS

English Abstract of Korean Document No. 5-290053, Published Nov. 5, 1993 in Korea (Korean Document No. 5-290053 was previously submitted in an Information Disclosure Statement filed Sep. 8, 2004).

English Abstract of Korean Document No. 6-8113, Published Jan. 18, 1994 in Korea (Korean Document No. 6-8113 was previously submitted in an Information Disclosure Statement filed Sep. 8, 2004).

English Abstract of Korean Document No. 8-40511, Published Feb. 13, 1996 in Korea (Korean Document No. 8040511 was previously submitted in an Information Disclosure Statement filed Sep. 8, 2004).

* cited by examiner

MANUFACTURING SYSTEM

CROSS-REFERENCE TO RELATED APPLICATIONS

This application claims the benefit of Korean Patent Application No. 2003-41248, filed Jun. 24, 2003, in the Korean Intellectual Property Office, the disclosure of which is incorporated herein by reference.

BACKGROUND OF THE INVENTION

1. Field of the Invention

The present invention relates to a manufacturing system, and in more detail, to a manufacturing system which is easily changeable in its arrangement depending on the amount of production.

2. Description of the Related Art

A manufacturing process generally comprises an assembling process to assemble products, an aging process for testing the operation of the products assembled, and a packing process for packing the products that have passed the aging test.

Such products include electronic products or machines such as computers, video apparatuses, audio apparatuses, and the like.

Hereinafter, a computer manufacturing system will be exemplarily described.

Computers are springing into wide use in almost every industry, and are developed and manufactured in various specifications for various purposes.

Especially, personal computers have rapidly enhanced quality recently, and the market requires the computer manufacturing system to be changed into a small quantity batch production system from a large quantity batch production system to satisfy users' demands, and consequently the manufacturing system is also required to improve its structure so as to be changeable in responding to an increase in production.

A conventional computer manufacturing system comprises an assembling unit performing a computer main body assembling process, an aging unit testing the operation of the computer main body assembled, and a packing unit packing the computer main body that passed the aging unit.

The assembling unit comprises a pallet accommodating the computer main body to be assembled, a transport device for transporting a plurality of pallets at a regular speed, and a plurality of worktables for assembly of the computer main body transported from the transport device.

The transport device has a conveyor chain transporting the plurality of pallets through a whole course of the manufacturing system at a regular speed, and a driving motor driving the conveyor chain. However, the transport device is pre-produced depending not on the amount of production of the computer main body but rather on the number of workers, therefore it is not easy to change the system structure depending on the amount of production.

The aging unit comprises an aging room capable of accommodating a plurality of assembled computer main bodies and performing an aging process.

The aging room is plurally provided in an aging unit region, and the aging room accommodates the plurality of computer main bodies assembled and performs the aging process. The aging room is fixedly disposed at a predetermined location to correspond to the number of computer main bodies to be tested, thus it is not easy to change the manufacturing system structure depending on the amount of production.

The packing unit comprises a plurality of pallets for accommodating the plurality of computer main bodies that passed the aging process, a transport device for transporting the plurality of pallets at a regular speed, and a plurality of worktables for performing the packing process.

The transport device provided in the packing unit has almost the same configuration as the transport device provided in the assembling unit.

However, in the conventional computer manufacturing system, each of the transport devices provided in the assembling unit and in the packing unit employs a single conveyor chain arranged along a whole transporting section, and the aging room is fixedly provided for in the aging process workflow, thus it is not easy to change the number of worktables and the aging room when the amount of production is varied.

SUMMARY OF THE INVENTION

Accordingly, it is an aspect of the present invention to provide a manufacturing system to be changeable in its arrangement responding to changes in the amount of production.

Additional aspects and advantages of the invention will be set forth in part in the description which follows and, in part, will be obvious from the description, or may be learned by practice of the invention.

The forgoing and/or other aspects of the present invention are achieved by providing a manufacturing system comprising a plurality of worktables detachably combined with each other, each of the worktables includes a mainframe; a transport part provided in an upper part of the mainframe and transporting a product; and a control part provided in the mainframe and controlling the speed of the transport part.

According to an aspect of the invention, the manufacturing system further comprises a calling button provided in the mainframe and wirelessly generating a calling signal during its operation.

According to an aspect of the invention, the manufacturing system further comprises a data transmitting/receiving part provided in the mainframe and wirelessly transmitting and receiving information for manufacturing management.

According to an aspect of the invention, the transport part comprises a conveyor belt to transport the product; a plurality of rollers supporting the conveyor belt; and a driving motor driving at least one of the rollers.

According to an aspect of the invention, the control part comprises a panel provided in the mainframe; and a control lever mounted on the panel for controlling the rotation speed of the driving motor.

According to an aspect of the invention, the manufacturing system further comprises a combining unit detachably combining the plurality of mainframes to each other.

According to an aspect of the invention, the combining unit comprises a bracket connecting a side of one mainframe and an adjacent side of the other mainframe at the same time; and a screw combining the bracket with the mainframe.

According to an aspect of the invention, the manufacturing system further comprises an assembling unit having thereon the plurality of worktables and assembling the product; an aging unit testing the operation of the product which has passed the assembling unit; a packing unit packing the product which has passed the aging unit; and wherein the assembling unit, the aging unit, and the packing unit are sequentially arranged.

According to an aspect of the invention, the aging unit comprises an aging vehicle accommodating the product which has passed the assembling unit.

According to an aspect of the invention, the aging vehicle has a plurality of casters movably provided in a bottom part thereof.

According to an aspect of the invention, the product includes a main body of a portable computer.

According to an aspect of the invention, the transport part is about 900 mm in length.

BRIEF DESCRIPTION OF THE DRAWINGS

The above and/or other aspects and advantages of the present invention will become apparent and more readily appreciated from the following description of the embodiments, taken in conjunction with the accompany drawings of which.

DETAILED DESCRIPTION OF THE PREFERRED EMBODIMENTS

Figure 1:
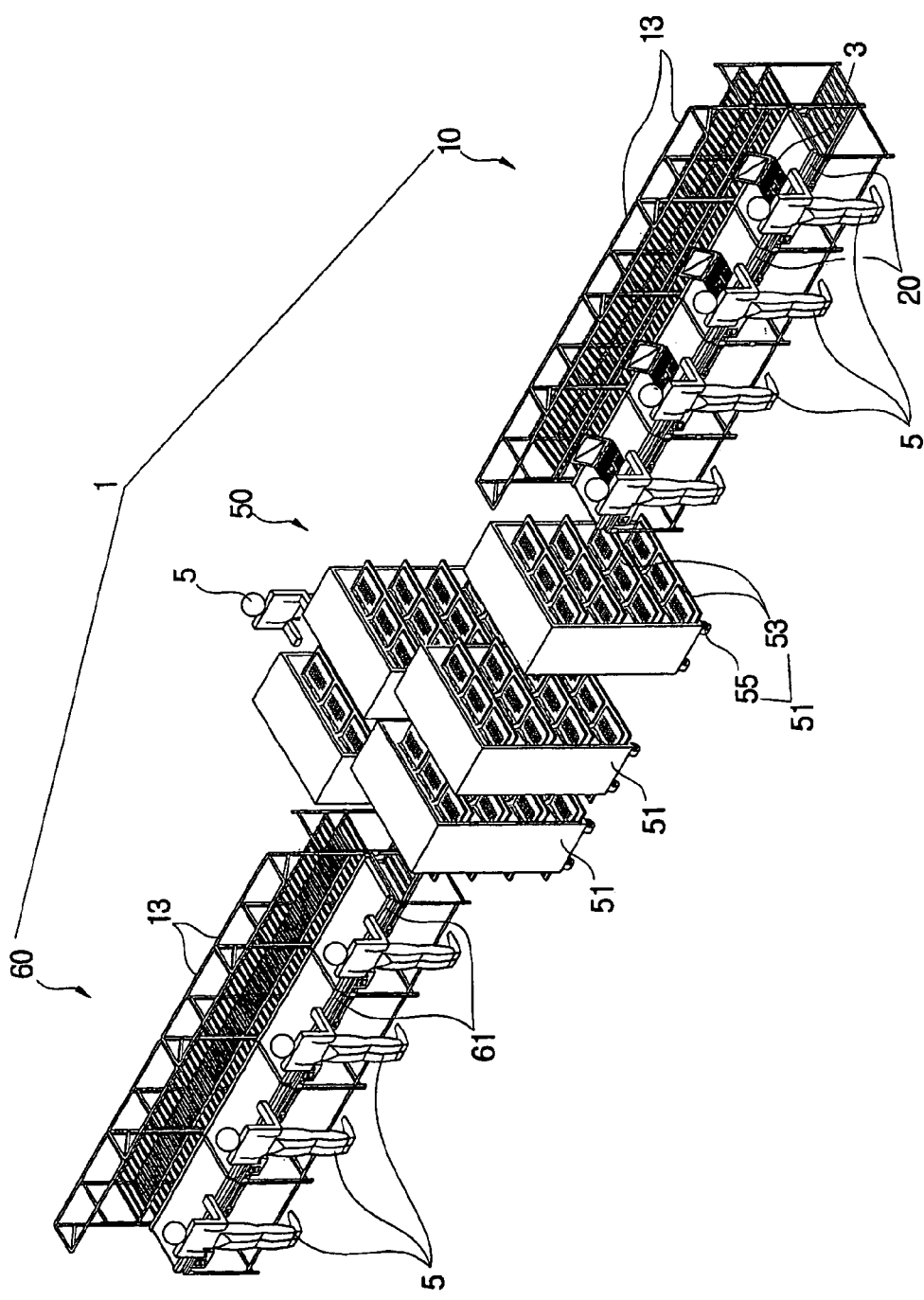
FIG. 1 is a schematic view of a computer manufacturing system according to the present invention.

Reference will now be made in detail to the embodiments of the present invention, examples of which are illustrated in the accompanying drawings, wherein like reference numerals refer to like elements throughout. The embodiments are described below in order to explain the present invention by referring to the figures.

As shown in FIG. 1 through FIG. 4, a computer manufacturing system 1, according to an example embodiment of the present invention, has an assembling unit 10 for performing an assembling process of a computer main body 3 of a portable computer; an aging (testing) unit 50 for performing an aging process to test the assembled computer main body 3; and a packing unit 60 for performing a packing process to pack the computer main body 3 that passed the aging process. It is preferred, but not required, that the assembling unit 10, the aging unit 50, and the packing unit 60 are sequentially arranged.

Figure 2:
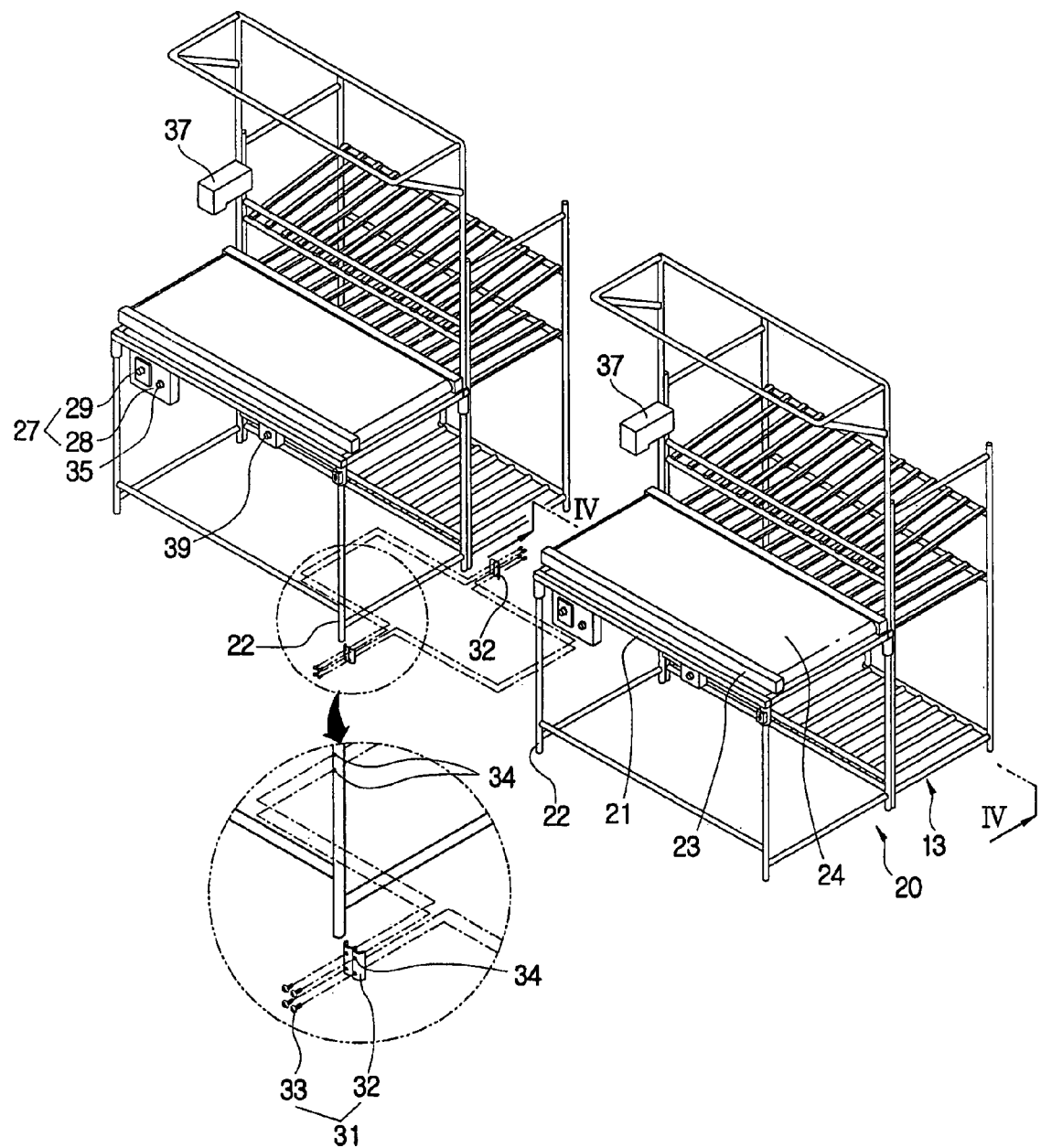
FIG. 2 is an exploded perspective view of a worktable provided in the computer manufacturing system in FIG. 1.
Figure 3:
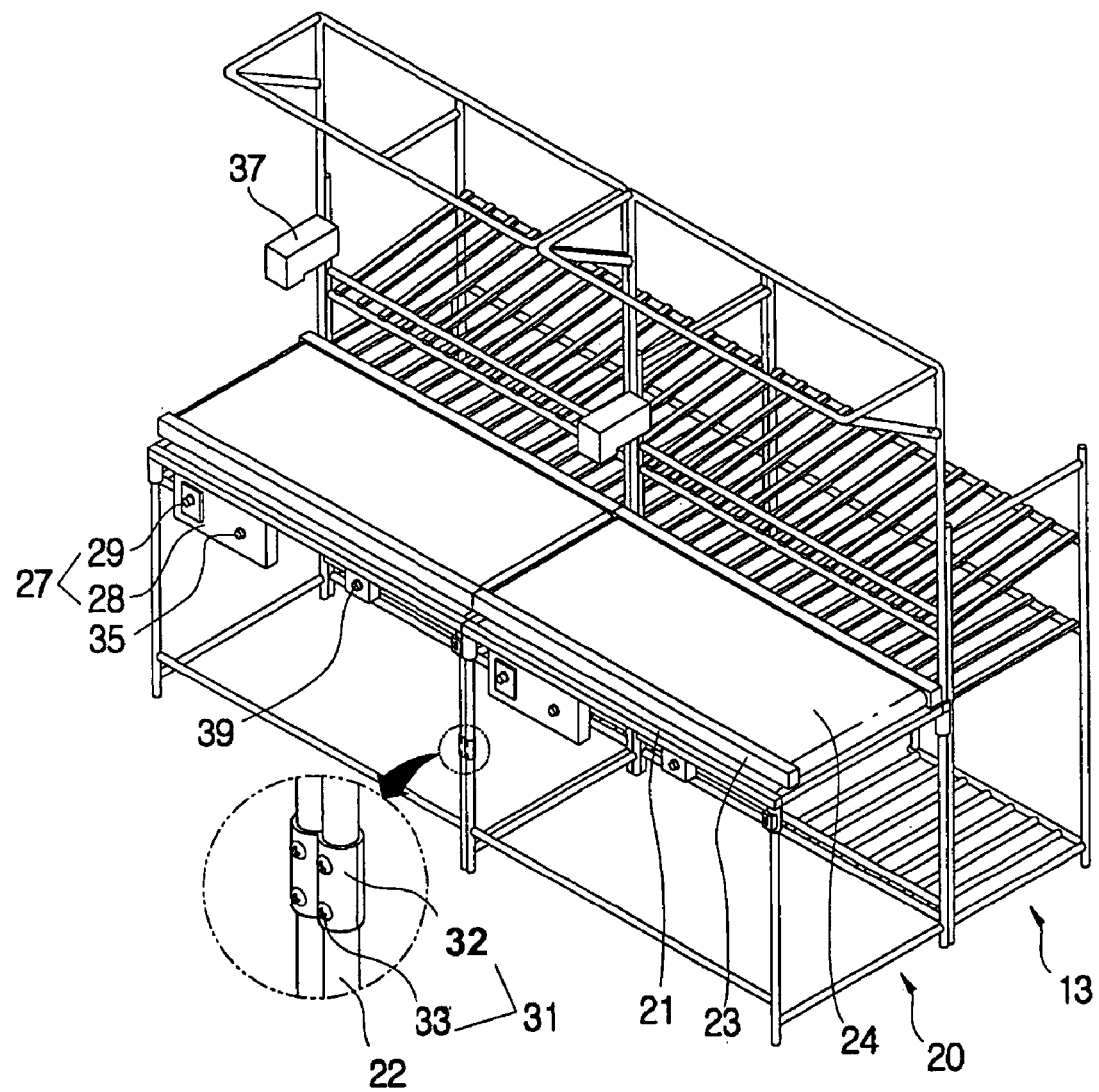
FIG. 3 is a combined perspective view of a worktable provided in the computer manufacturing system in FIG. 2.
Figure 4:
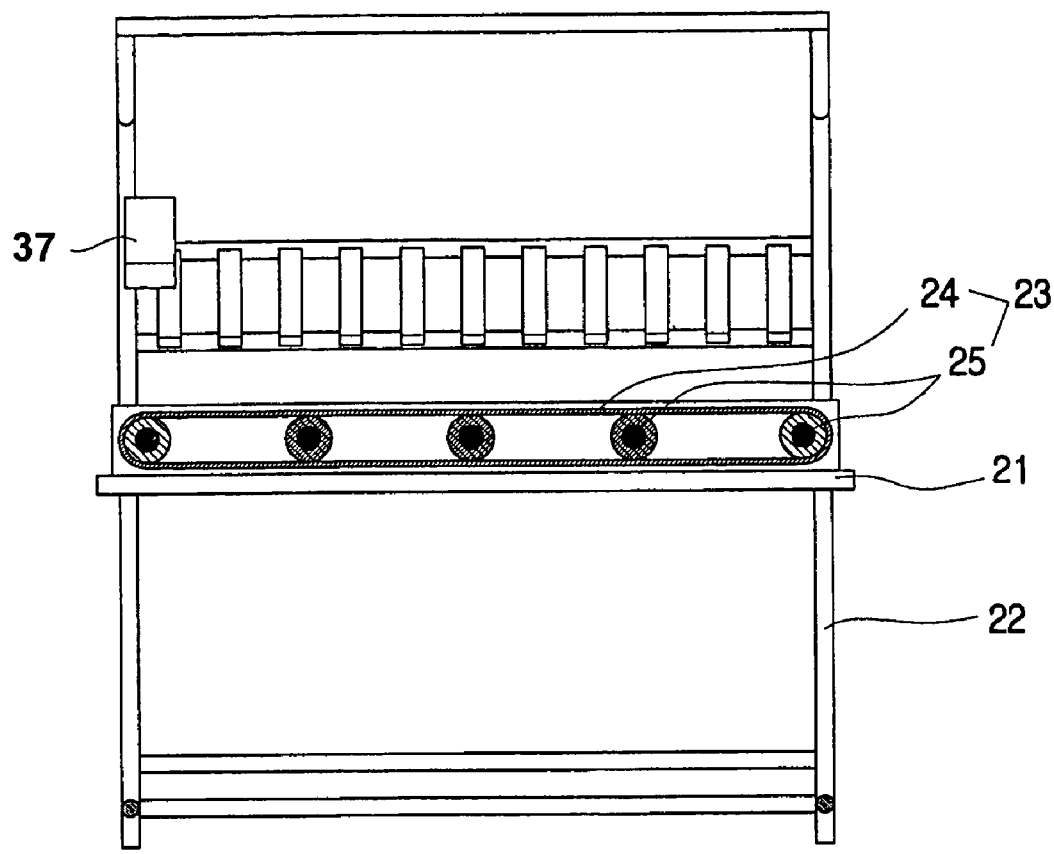
FIG. 4 is a sectional view of a worktable, taken along a line IV—IV in FIG. 2.

The assembling unit 10 comprises a plurality of worktables 20 detachably combined with each other so that the assembling process of the computer main body 3 can be performed by a plurality of workers 5. It is preferred, but not required, that a combining unit 31 as shown in FIG. 2, is provided in the assembling unit 10 to detachably combine the worktables 20 together.

The worktable 20 comprises a mainframe 21, a transport part 23 disposed on an upper part of the mainframe 21 to transport the computer main body 3, and a control part 27 that controls the transporting speed of the transport part 23. The worktable 20 further comprises a calling button 35 that is wirelessly connected in the mainframe 21 and generates a calling signal when actuated. The worktable 20 also includes a data transmitting/receiving part (not shown) that is wirelessly connected in the mainframe 21 for transmitting and receiving information on to the manufacturing management system about the computer main body 3. At the rear of the worktable 20, a component rack 13 is provided to supply components used for assembling the computer main body 3.

The mainframe 21 generally approximates a table shape, having legs 22, and the transport part 23 is provided on an upper part to transport the computer main body 3. In one example of the present invention, each of the mainframes 21 is about 900 mm in length along a transporting direction for one worker 5, and about 1800 mm in length for two workers 5 to work on.

The transport part 23 includes a conveyor belt 24 to transport the computer main body 3 that is to be assembled, a plurality of rollers 25 that rotatably support the conveyor belt 24, and a driving motor (not shown) driving at least one of the plurality of rollers 25.

The conveyor belt 24 has a predetermined width sized to accommodate the computer main body 3, and may be rotatably combined with other conveyor belts 24 from other worktables 20 along a transporting direction of the mainframe 21. Transporting sections of the conveyor belt 24 and the mainframe 21 disposed along the transporting direction are preferably identical to each other in length. However, it is to be appreciated that varying the lengths of the components is within the scope of the invention.

The rollers 25 are pipe shaped, and provide rotational support to the conveyor belt 24. At least one of the rollers 25 is rotatably connected with the driving motor, thereby causing the conveyor belt 24 to rotate.

The control part 27 comprises a panel 28 provided in the mainframe 21, and a control lever 29 mounted at the panel 28 to control the speed of the driving motor.

The panel 28 is disposed frontward of the mainframe 21 and in a bottom part of the transport part 23 so that the worker 5 may control the panel 28 with ease. In this aspect of the present invention, the worktable 20 should have an emergency stop button 39 to stop the conveyor belt 24.

The calling button 35 is provided in the panel 28 and is wirelessly connected with a calling display plate (not shown) separately disposed with the worktable 20, so that the worker 5 can readily cope with an emergency situation during operation.

The data transmitting/receiving part and scanner 37 are provided in a common housing on the worktable 20 to read codes of components used during the assembling processes of the computer main body 3 and wirelessly transmitting and receiving the read data to an information department of production management (not shown).

The combining unit 31 comprises a bracket 32 connecting one side of the mainframe 21 and the other side of an adjacent mainframe 21 at the same time, and a number of screws 33 screwing the bracket 32 to each of the mainframes 21. Other fasteners may be substituted for the screws, for example nuts and bolts or clamps. The bracket 32 is provided to join each of legs 22 of the mainframes 21 and of the adjacent mainframes 21 at the same time, thereby combining the mainframes 21, forming a pair. In this example of the present invention the legs 22 to which each of brackets 32 is adjacent, have screw holes 34 formed and may be attached by the screws 33.

The aging unit 50 includes an aging (testing) vehicle 51 that is capable of accommodating the plurality of the computer main bodies 3 assembled for the aging process.

The aging vehicle 51 has a plurality of shelves 53 accommodating a plurality of the computer main bodies 3, and a plurality of casters 55 are provided in a bottom part of the aging vehicle 51, thereby allowing the aging vehicle 51 to be moved easily. It is preferable to provide about four casters, though other quantities and arrangements are possible. Various kinds of tests may be performed in this testing unit 50.

The packing unit 60 has a plurality of packing tables 61 for accommodating the computer main bodies 3 that passed the aging process.

The packing table 61 has a similar configuration to the worktable 20 of the assembling unit 10, and thus the description thereof will not be repeated.

With this configuration, a process of arrangement of the computer manufacturing system and a process of changing the arrangement according to the present invention are as follows.

As shown in FIG. 1, a plurality of worktables 20 are placed in a row and combined with each other by the brackets 32 and the screws 33. A component rack 13 is placed at one side of each of the worktables 20, thus completing the assembling unit 10. Then, the worker 5 stands by the other side of each of the worktables 20 to perform the assembling process of the computer main body 3 transported by the transport part 23. The number of the worktables 20 provided in the assembling unit 10 can be easily adjusted by joining or removing additional worktables 20 through the brackets 32 and the screws 33.

In each of the worktables 20, the control part 27 controlling the speed of the transport part 20 is provided, therefore the worker 5 can control the speed of the computer main body 3 as necessary, and the data transmitting/receiving part 37 and the wireless calling button 35 are also provided to wirelessly transmit and receive production management information, so that each of the worktables 20 may be disassembled or additionally assembled with ease.

At the end of the assembling unit 10 where the assembling process is completed, the plurality of aging vehicles 51 are provided. Then, the completely assembled computer main body 3 is readily accommodated on the shelf 53 of the aging vehicle 51, therefore the aging process can proceed. In the aging vehicle 51, the plurality of casters 55 are mounted underneath to facilitate movement of the aging vehicle 51, thereby allowing the number of aging vehicles 51 provided in the aging unit 50 to be altered with ease.

In the packing unit 60, the plurality of packing tables 61 are placed in a row at a rear of the aging unit 50. Then, the worker 5 stands at each of the packing tables 61 to pack the computer main body 3. The number of the packing tables 61 provided in the packing unit 60 can be adjusted by the same method used for controlling the number of the worktables 20 in the assembling unit 10. The worker also can control the speed that the computer main body 3 moves along the packing table 61 in a similar fashion as in the worktable 20.

Figure 5:
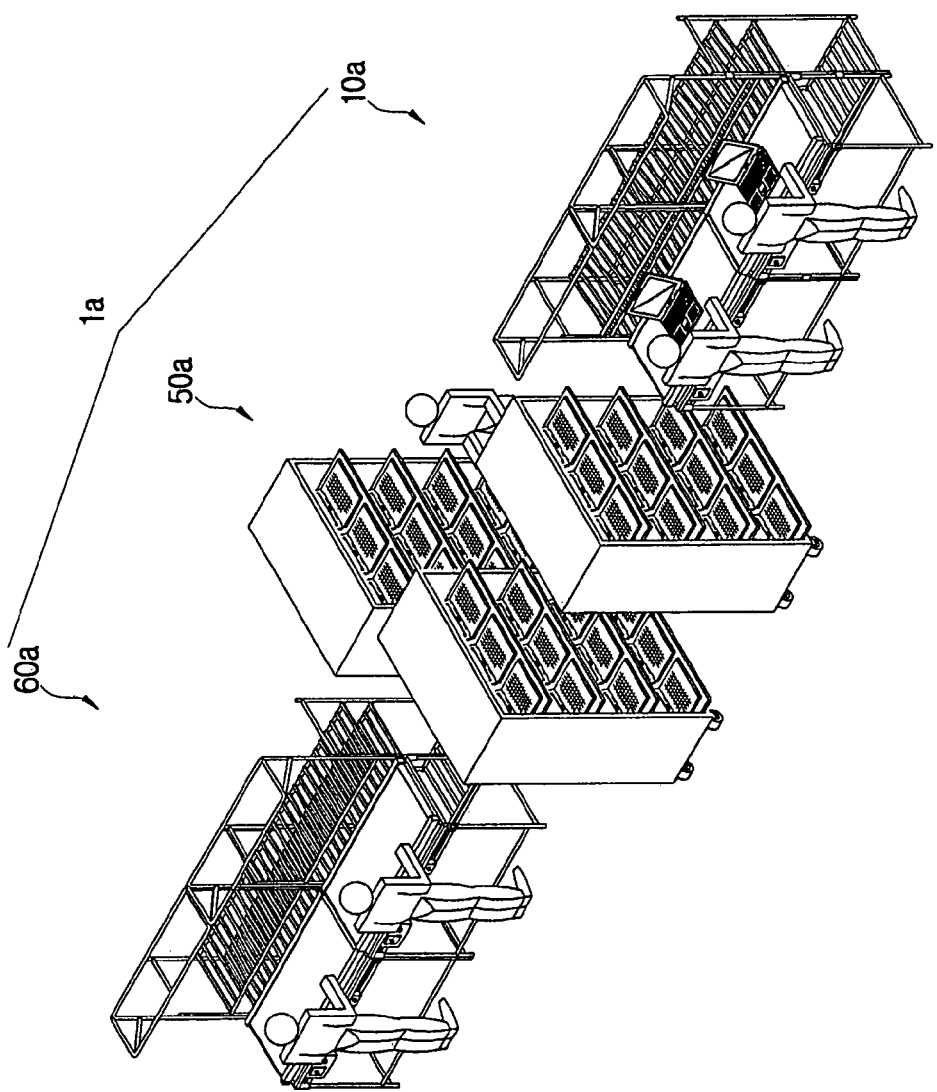
FIG. 5 is a schematic view of a changed arrangement of the computer manufacturing system of in FIG. 1.

FIG. 5 schematically illustrates an alternative arrangement of the computer manufacturing system according to an aspect of the present invention. As shown therein, a computer manufacturing system 1 is an example of a small-scale computer manufacturing system. Based on the user's demands the computer manufacturing system 1 in FIG. 1 may be changed to a small quantity batch production system from a large quantity batch production system. That is, the number of the worktables 20, the number of the aging vehicles 51, and the number of the packing tables 61 shown in FIG. 1 are respectively reduced, thereby changing an assembling unit 10a, an aging unit 50a, and a packing unit 60a into the small quantity batch production system as shown in FIG. 5.

Therefore, the computer manufacturing system 1 according to the present invention can be reconfigured depending on the amount and rate of production by having the plurality of worktables 20 and the plurality of packing tables 61 detachably combined with each other, and the aging vehicles 51 movable.

The worker 5 can individually control the speed of transporting the computer main body 3 depending on his/her proficiency and preference at each of the worktables 20. The wireless data transmitting/receiving part 37 and the calling button 35 are provided at each worktable 20 to send signals so that workers 5 may disassemble or additionally assemble each of the worktables 20 as instructed.

According to an example embodiment of the present invention, the brackets 32 and the screws 33 are used for the combining unit 31 to combine each of the worktables 20 but a bolt and nut, or elastic clips may be used as long as they can detachably combine each of the worktables 20.

According to an embodiment of the present invention, the example of the product in the manufacturing system is limited to the computer main body 3 of portable computers, but it can also be a desktop computer or a tower computer, and other electric products or machines such as a video device, a sound device, and the like.

In another aspect of the present invention, workflow may be set up to proceed in a direction opposite that shown.

With this configuration, a manufacturing system according to the present invention provides independent control of each of the plurality of worktables, and each of the worktables has a mainframe, a transport part disposed on an upper part of the mainframe for transporting products, and a control part disposed in the mainframe and controlling the speed of the transport part, thereby readily changing a system arrangement depending on the amount of production of the products as well as independently controlling the transportation speed in each worktable. A wireless data transmitting/receiving part and a calling part are also provided to enable worktables to be easily removed or added by signaling workers based upon production management information.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A manufacturing system comprising a plurality of worktables detachably combined with each other, each worktable comprising:
    a mainframe;
    a transport part provided in an upper part of the mainframe and transporting a product;
    a control part comprising a panel provided in the mainframe and controlling a variable transporting speed of the transport part,
    a calling button provided in the mainframe and wirelessly generating a calling signal during its operation; and
    a data transmitting/receiving part provided in the mainframe and wirelessly transmitting and receiving information for manufacturing management,
    wherein the transport part comprises:
    a conveyor belt to transport the product;
    a plurality of rollers supporting the conveyor belt; and
    a driving motor driving at least one of the rollers, and
    wherein the control part comprises a control lever mounted on the panel and controlling the rotation speed of the driving motor.

2. A manufacturing system comprising a plurality of worktables detachably combined with each other, each worktable comprising:
   a mainframe;
   a transport part provided in an upper part of the mainframe and transporting a product;
   a control part comprising a panel provided in the mainframe and controlling a variable transporting speed of the transport part, and
   a combining unit detachably combining the plurality of mainframes to each other, wherein the combining unit comprises:
   a bracket connecting a side of one mainframe and an adjacent side of the adjacent mainframe at the same time; and
   a screw combining the bracket with the mainframe.

3. A manufacturing system comprising a plurality of worktables detachably combined with each other, each worktable comprising:
   a mainframe;
   a transport part provided in an upper part of the mainframe and transporting a product;
   a control part comprising a panel provided in the mainframe and controlling a variable transporting speed of the transport part;
   an assembling unit having thereon the plurality of worktables and assembling the product;
   a testing unit testing operation of the product which has passed the assembling unit; and
   a packing unit packing the product which has passed the testing unit,
   wherein the assembling unit, the testing unit, and the packing unit are sequentially arranged.

4. The manufacturing system according to claim 3, wherein the testing unit comprises the testing vehicle accommodating the product, which has passed the assembling unit.

5. The manufacturing system according to claim 4, wherein the testing vehicle has a plurality of casters movably provided in a bottom part thereof.

6. The manufacturing system according to claim 3, wherein the product includes a main body of a portable computer.

7. The manufacturing system according to claim 3, wherein the transport part is about 900 mm in length.

8. A flexible manufacturing system for assembling products comprising:
   an assembly unit having a plurality of worktables, wherein each worktable has a variable speed transport part moving products as the products are being assembled and a control panel controlling the speed of the transport part;
   a testing unit having a plurality of movable racks wherein the assembled products are tested; and
   a packaging unit having a plurality of packing tables, wherein each packing table has a variable speed transport part moving products as the products are being packaged and a control panel controlling the speed of the transport part,
   wherein the assembling unit, the testing unit, and the packing unit, are sequentially arranged.

9. The flexible manufacturing system for assembling products as in claim 8, further comprising a plurality of combining units for removably coupling worktables together and packing tables together.

10. The flexible manufacturing system for assembling products as in claim 9, further comprising a component rack located near each worktable.

11. The flexible manufacturing system for assembling products as in claim 9, further comprising a component rack located near each packing table.

12. The flexible manufacturing system for assembling products in claim 8, wherein each worktable comprises a calling button provided in the mainframe and wirelessly generating a calling signal during its operation.

13. A reconfigurable manufacturing system for assembling products comprising:
   an assembly unit having a worktable, wherein the worktable has a variable speed transport part moving products as they are being assembled and a control panel controlling the speed of the transport part, and wherein additional worktables are addable to the manufacturing system as needed by joining together adjacent worktables with a combining unit; and
   a packaging unit having a packing table, wherein the packing table has a variable speed transport part moving assembled products as they are being packaged and a control panel controlling the speed of the transport part and wherein additional worktables are addable to the manufacturing system as needed by joining together adjacent packing tables with a combining unit.

14. The reconfigurable manufacturing system for assembling products as in claim 13, further comprising scanners respectively at each worktable for tracking production management information and relaying the information wirelessly to a remote location for processing.

15. The reconfigurable manufacturing system for assembling products as in claim 14, wherein the combining unit includes a bracket that couples a side of one worktable and an adjacent side of another worktable; and
   fasteners joining the bracket to the worktables.

16. The reconfigurable manufacturing system for assembling products as in claim 15, further comprising a testing unit, disposed in a sequential arrangement with the assembly unit and packaging unit, and having a plurality of movable racks wherein the assembled products are tested; and
   wherein only the products that pass the tests are moved to the packaging unit.

17. The reconfigurable manufacturing system for assembling products as in claim 13, wherein the transport part of each worktable and packing table is capable of independent speed control.

18. The reconfigurable manufacturing system for assembling products as in claim 17, wherein the speed of each worktable and packing table is selected by a worker at each worktable and each packing table.

19. The flexible manufacturing system for assembling products in claim 13, wherein each worktable comprises a calling button provided in the mainframe and wirelessly generating a calling signal during its operation.

* * * * *